April 16, 1929.  H. JUNKERS  1,709,621
METHOD AND MEANS FOR NAVIGATING AIRCRAFT
Filed Jan. 21, 1927
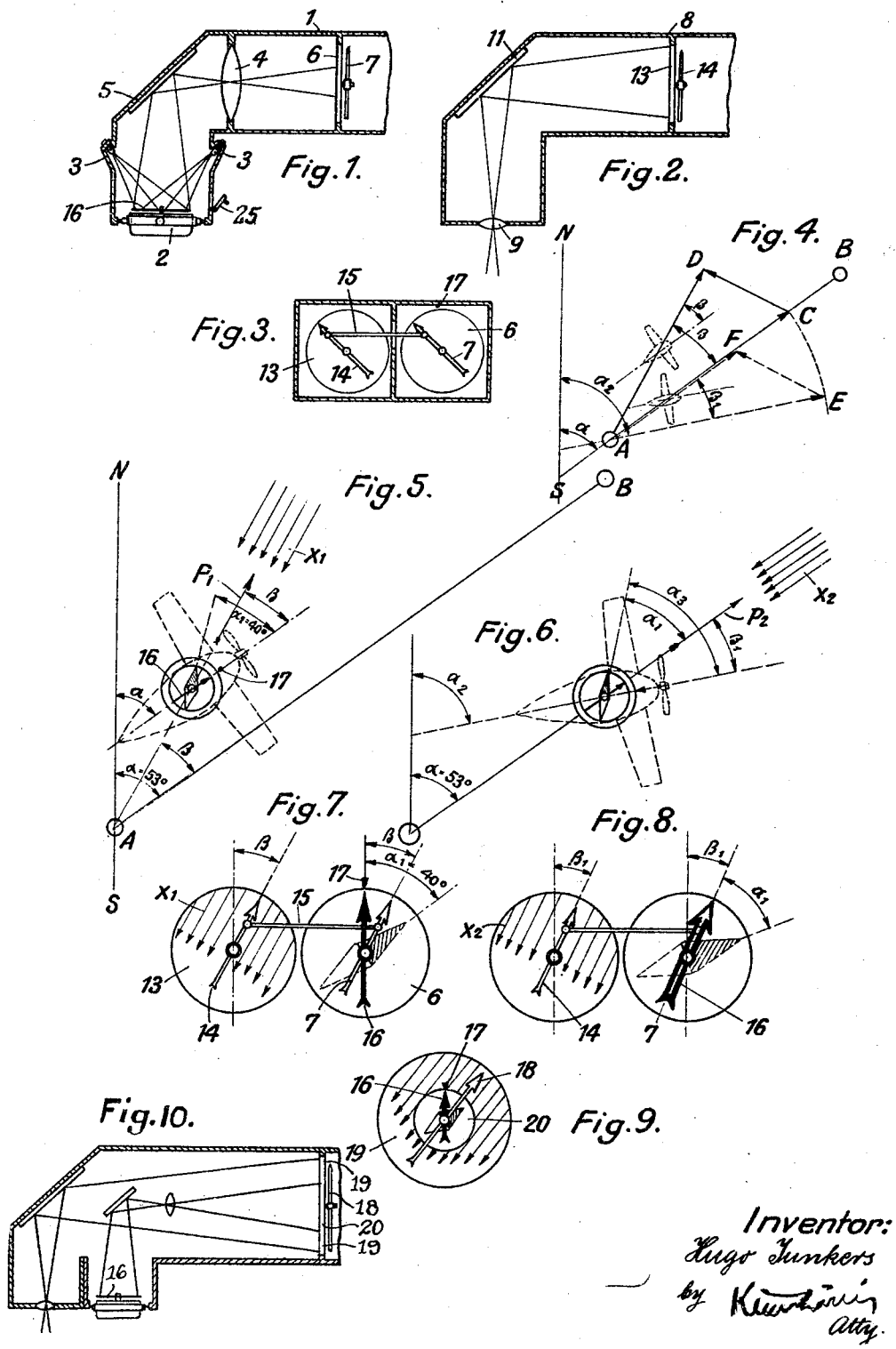
Inventor:
Hugo Junkers Patented Apr. 16, 1929.

1,709,621

UNITED STATES PATENT OFFICE.

HUGO JUNKERS, OF DESSAU, GERMANY.

METHOD AND MEANS FOR NAVIGATING AIRCRAFT.

Application filed January 21, 1927, Serial No. 162,560, and in Germany January 21, 1926.

My invention refers to the navigation of aircraft, and it has for its object the provision of means whereby aircraft can be navigated in an easier and more perfect manner than was hitherto possible.

As is well known to those skilled in the art when navigating aircraft particular difficulties are encountered in marking and considering the deviation of the craft produced by sidewind relative to the course to be made in accordance with the map, taking into consideration the faulty indications of the compass including deviation, in such manner that the pilot is enabled to ascertain at any moment and without circumstantial calculation, that course of compass which in view of the deviation prevailing at the particular moment will lead the craft to the desired place. In order to attain this end it has been suggested to have a separate observer observe the displacement of the ground relative to the craft by means of a suitable sounding instrument and mark the deviation of this displacement from the course actually made on a movable mark on the compass, which was previously adjusted to deviation-less course, the pilot at the same time tending to steer the craft in such manner that the compass needle is always set on this mark. If one has once succeeded in this manner to cause the displacement of ground to always extend in parallel to the deviationless course, the pilot need only further follow the compass course resulting from the position of the compass mark, in order to lead his craft with comparative exactness to the desired place, provided that the deviation remains constant.

This method involves the drawback of requiring for navigation two persons who must be carefully trained for cooperation.

In the method of navigation according to the present invention the observation of the displacement of ground during flight and its transference onto the compass is also made use of, but the way in which this method is practiced is simplified to such an extent that the pilot can easily practice it by himself.

The new method according to the present invention is characterized thereby that real images of the movable part of the compass (needle or card) and of the ground over which the craft is flying, are produced by optical means, that further the direction of displacement of ground rendered visible by the wandering of the image of ground is transferred either mechanically or optically onto the image of the compass, and that the craft is then steered so as to assume the position in which the direction of the displacement of the ground image coincides with the direction, ascertainable from the image of the compass, of the deviationless course.

An instrument for carrying out this process can for instance be designed in such manner that two optical devices project an image of the compass and an image of the ground or country onto two separate screens, for instance ground glass frames, which are preferably arranged in close juxtaposition at a level with the eyes and in front of the pilot, so that this latter can observe them easily without, however, being hindered in the observation of the horizon and of other instruments. Each screen carries a rotary pointer, and the two pointers are coupled for adjustment in the same direction and allow transferring the direction of displacement of the ground onto the image of the compass.

In the drawings affixed to this specification and forming part thereof a device embodying my invention is illustrated diagrammatically by way of example.

In the drawings—

Figs. 1 and 2 are axial longitudinal sections of the devices for producing real images of the compass and the ground, Fig. 3 is a front view of the two devices as viewed by the pilot.

Figs. 4–6 are diagrams illustrating the navigation of an aircraft by means of this instrument, and Figs. 7 and 8 illustrate the screens forming part of the device illustrated in Fig. 3, with the images and pointers in the positions imparted to them while navigating the craft according to Figs. 4–6, Figs. 9 and 10 illustrate another modification.

Referring first to Fig. 1, which illustrates the device for producing an image of the compass, 1 is a case and 2 is the compass mounted therein by means of a Cardan suspension. 3, 3 are lamps for projecting light onto the compass. A real image of the compass is projected by means of a plane mirror 5 and lens 4 onto the ground glass frame 6, on which is rotatably mounted a pointer 7. The flap 25 mounted in front of an aperture of the case 1 enables the pilot to adjust the pointer 16 mounted on the movable part of the compass (needle or card), this pointer serving for marking the course of the compass. The image of the compass projected onto the screens is a reflected image.

As shown in Fig. 2, 8 is a similar case in which the image of the ground is projected by means of a lens 9 and plane mirror 11 onto a ground glass frame 13, on which is rotatably mounted the pointer 14.

As shown in Fig. 3, the pointers 7 and 14 are coupled by means of a link 15, and on the screen 6 reproducing the image of the compass is provided a stationary mark 17 indicating the longitudinal axis of the craft.

In order to explain the way in which this device is handled in practical use, I will first set the following problem of navigation, which is illustrated in Fig. 4, to wit:—It is desired that the craft travel from A to B, corresponding to a mapped-out course of $\alpha = 53°$ relative to the geographical north-south direction marked by the line N—S. Let us assume that the faulty indication of the compass for the points A and B averages $+5°$, and that the deviation for the compass course of 48° resulting therefrom is $+8°$, so that if there is no sidewind a deviationless compass course of $\alpha_1 = 40°$ should be followed, the velocity of propulsion of the craft relative to air being indicated by the distance A—C in the case of sidewind, the velocity and direction of which is determined by the distance CD. The craft flying with its longitudinal axis at an angle $\alpha$ relative to the N—S direction, instead of reaching C (in the direction towards B) will get to D and the ground will displace itself relative to the longitudinal axis of the craft at an angle DAC = $\beta$. In order to compensate for deviation, the pilot has to place the longitudinal axis of the craft in the direction A—E which results from the triangle of velocity AEF, wherein AE = AC = velocity of the craft relative to air and EF = CD = velocity of wind. The craft thus adjusted travels on the correct course A—F—B. Its longitudinal axis includes the angle $\alpha_2$ with the N—S direction. The new angle of deviation FAE = $\beta_1$ will as a rule not be equal to the angle of deviation $\beta$ mentioned before, so that the determination of this angle is not competent for the angle of allowance "$\beta_1$" to be observed. It is from these causes that the navigation of air craft, more especially over uniform or not easily visible or unknown ground is rendered so very difficult.

My invention now enables the pilot to ascertain in a simple manner the correct position of the longitudinal axis of the craft, as shall now be shown with reference to Figs. 5–9.

Fig. 5 shows the craft travelling from A to D (Fig. 4) together with its compass which is drawn to an exaggerated scale. The longitudinal axis of the craft is disposed in parallel to the direction A—B. It encloses an angle $\alpha$ with the N—S direction and an angle $\beta$ with the direction of travel (arrow $p_1$). The pointer 16 on the compass card is set onto the angle $\alpha_1 = 40°$ corresponding to the deviationless compass course, and therefore contacts with the stationary mark 17 determining the direction of the longitudinal axis of the craft. The apparent displacement of ground occurs, as indicated by the arrows $x_1$, counter to the direction of flight, indicated by arrow $p_1$, at an angle $\beta$ to the axis of the craft.

Fig. 7 illustrates the images produced in the device shown in Fig. 3, which correspond to this flight of the craft in which the images of the compass and of the ground are reversed relative to the axis of the craft. If the pointer 14 and together with it pointer 7 are set in the direction of the displacement of ground, as shown in the drawing, the angle enclosed between the pointers 7 and 16 (angle $\beta$) corresponds to the deviation.

In order now to set the craft on the correct course, the pilot must actuate the vertical rudder so as to turn the craft until pointer 16 and pointer 7, which must be adapted to the image of displacement of ground at that moment, come to coincide (Fig. 8). At this moment the craft has reached the position shown in Fig. 6, in which the displacement of ground (arrows $x_2$) extends in parallel with the desired direction of flight (arrow $p_2$) indicated by the pointer 16. In other words, the craft now moves on the correct course in the direction towards B. The pilot now has only to take care that the pointer 14 always extends in parallel to the displacement of ground and that the two pointers 7 and 16 coincide.

When turning with the craft the angle indicated on the compass between the northern point of the needle and the fixed mark 17 will grow, and it may happen that at the same time also the deviation (which had been assumed to be $+8°$) varies. In such case the pointer 16 would no longer extend exactly in the direction A—B, but would be deflected therefrom by the difference of deviation. However this deviation is negligible in most cases. It can, however, also be taken into consideration without any difficulty, if the new deviation for the angle $\alpha_3$ on the compass after turning is ascertained from the table, whereupon pointer 16 is adjusted on the compass card onto the angle of course resulting from faulty indication and new deviation, and the image of the pointer thus adjusted is made to coincide with the direction of displacement of ground. Of course a variation of the faulty indication of the compass during a flight of long extension might be considered in a similar manner.

Instead of displacing the images of the ground and the compass in juxtaposition, optical means may be provided for superposing them, as shown for instance in Figs. 9 and 10, where the pointers 14 and 7 are replaced by a simple manually adjustable pointer 18, which extends across both images 19 and 20. It is therefore possible to project the pointer 16 indicating the course by itself onto the image of the ground, for instance as a luminous line. Separate adjustable pointers are thus dispensed with altogether, so that the device need not be manually adjusted during flight.

In the case where the pointer 16 indicating the course should not be easily mountable on the compass card or should be difficult to handle, it can also be connected with one of the adjustable pointers, or else be replaced by rendering one of the images rotatable, for instance by rotating one of the mirrors 5 or 11 around the axis of the light rays.

I wish it it be understood that I do not desire to be limited to the exact details of construction shown and described for obvious modifications will occur to a person skilled in the art.

I claim:

1. The method of navigating aircraft by means of a compass comprising producing real images of a movable part of the compass and of the ground, transferring the direction of the apparent relative motion of the ground from said ground image onto said compass image and steering the craft so as to produce coincidence of the direction of motion of the ground image with the compass course.

2. The method of navigating aircraft by means of a compass comprising producing real images of a movable part of the compass and of the ground, mechanically transferring the direction of the apparent relative motion of the ground from said ground image onto said compass image and steering the craft so as to produce coincidence of the direction of motion of the ground image with the compass course.

3. Means for navigating aircraft comprising a compass, optical means for producing a real image of a movable part of said compass and a real image of the ground travelled over and means for transferring the direction of the apparent relative motion of the ground from said ground image onto said compass image.

4. Means for navigating aircraft comprising a compass, a screen and two optical devices for producing real images of a movable part of said compass and of the ground travelled over and means for transferring the direction of the apparent relative motion of the ground from said ground image onto said compass image.

5. Means for navigating aircraft comprising a compass, a screen, two optical devices for producing real images of a movable part of said compass and of the ground travelled over, means for transferring the direction of the apparent relative motion of the ground from said ground image onto said compass image visible on said screen, and a manually operable means for indicating on said screen the direction of displacement of the ground.

6. Means for navigating aircraft comprising a compass, two juxtaposed screens, two optical devices for producing real images of a movable part of said compass and of the ground travelled over and for projecting each image onto a separate screen, a pointer associated with each screen and a connection between said pointers warranting parallel displacement thereof.

In testimony whereof I affix my signature.

HUGO JUNKERS.